United States Patent [19]

Link et al.

[11] Patent Number: 4,856,156
[45] Date of Patent: Aug. 15, 1989

[54] ROLL ARRANGEMENT CONTAINING A CONTROLLED DEFLECTION ROLL

[75] Inventors: Christoph Link, Weingarten; Herbert Brandiser, Mochenwangen, both of Fed. Rep. of Germany

[73] Assignee: Sulzer-Escher Wyss AG, Zürich, Switzerland

[21] Appl. No.: 176,263

[22] Filed: Mar. 31, 1988

[30] Foreign Application Priority Data

Apr. 8, 1987 [DE] Fed. Rep. of Germany ....... 3711856

[51] Int. Cl.⁴ ............................................ B60B 15/16
[52] U.S. Cl. ..................................... 29/115; 29/116.2
[58] Field of Search ........... 29/113 AD, 116 AD, 115

[56] References Cited

U.S. PATENT DOCUMENTS

| | | | |
|---|---|---|---|
| 4,000,979 | 1/1977 | Biandetti | 29/115 |
| 4,352,228 | 10/1982 | Iso-Aho | 29/115 |
| 4,402,233 | 9/1983 | Toivonen et al. | 29/115 X |
| 4,620,348 | 11/1986 | Güttinger | |

*Primary Examiner*—Timothy V. Eley
*Attorney, Agent, or Firm*—Werner W. Kleeman

[57] ABSTRACT

The roll arrangement comprises a controlled deflection roll provided with a roll shell which is rotatable about a stationary carrier and is supported at the latter by support or pressure elements. An additional load bears upon one end of the roll shell. The inherent weight and/or the bending moments caused by the additional load and transmitted to the roll shell are compensated by a supporting structure. As such supporting structure there may be provided a counterweight which acts essentially at the region of the center of gravity of the additional load.

11 Claims, 2 Drawing Sheets

ROLL ARRANGEMENT CONTAINING A CONTROLLED DEFLECTION ROLL

BACKGROUND OF THE INVENTION

The present invention broadly relates to a new and improved construction of a roll arrangement comprising a controlled deflection roll.

In its more specific aspects the present invention relates to a roll arrangement comprising a controlled deflection roll containing a stationary carrier or beam, also referred to in the art as a yoke, arranged in a roll stand. Upon the stationary carrier or beam there is supported a rotatable roll shell or jacket by means of support or pressure elements. By means of these support or pressure elements the roll shell or jacket is displaceable in at least one radial direction relative to the lengthwise axis of the roll shell or jacket. A load is arranged at one end of the roll shell or jacket, and this load participates in the displacement or shifting movements of the roll shell or jacket.

A roll arrangement of this general type and containing a controlled deflection roll is described and illustrated in the West German Pat. No. 2,507,677, granted Oct. 19, 1978.

In this heretofore known roll arrangement, the roll shell or jacket is driven so as to rotate by means of a stationarily arranged motor which acts upon a gearing unit or gear transmission. This gearing unit or gear transmission is externally located at one end of the roll shell or jacket and is coupled via a Cardan shaft with the output shaft of the motor, so that the gearing unit or gear transmission can participate in the elevational movements of the roll shell or jacket. The reaction torque is supported at the roll stand.

The support elements therefore must not only carry the inherent weight of the roll shell or jacket and produce the forces acting in the roll nip, but also must carry the load acting at one side or end of the roll arrangement, which can be considerable and originates from the inherent weight of the gearing unit or gear transmission. Therefore, the support elements must be appropriately dimensioned and structured and this is also the case for the power system which is provided for the powering or control of the support elements. This applies regardless of whether the support elements operate hydrostatically as described in the aforementioned German Pat. No. 2,507,677, or electromagnetically or in any other suitable manner. These considerations are also generally applicable for an additional load acting at the end of the roll shell or jacket.

SUMMARY OF THE INVENTION

Therefore, with the foregoing in mind, it is a primary object of the present invention to provide a new and improved contruction of a roll arrangement including a controlled deflection roll which is not afflicted with the aforementioned drawbacks and shortcomings of the prior art constructions.

Another and more specific object of the present invention is directed to a new and improved construction of a roll arrangement containing a controlled deflection roll and which is structured in such a way that the layout or design of the controlled deflection roll can be determined without having to take into consideration any such possible additional loads which even may not be known at the time of the design of the roll arrangement.

Yet a further noteworthy object of the present invention is concerned with a new and improved construction of a roll arrangement of the aforementioned type, which is relatively simple is construction and design, highly reliable in operation, not readily subject to breakdown or malfunction and requires a minimum of maintenance and servicing.

Now in order to implement these and still further objects of the invention, which will become more readily apparent as the description proceeds, the roll arrangement of the present development is mainfested, among other things, by the features that there are provided means for supporting at the roll stand or the like, at least part of the inherent weight of the load.

Such supporting means can operate mechanically, hydraulically, magnetically or in another suitable manner. It is preferable if the support or supporting action is independent of the actual elevational position or displacement of the roll shell or jacket.

Such an additional load at the end of the roll shell or jacket also transmits bending moments to the roll shell or jacket. It is generally preferred to also compensate such bending moments by the supporting means; in other cases, it even could be desirable to transmit such additional bending moments to the roll shell or jacket.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the structure of the roll arrangement and the construction of the controlled deflection roll thereof and designed according to the teachings of the present invention have been illustrated therein as are needed to enable one skilled in the art to readily understand the underlying principles and concepts of this invention.

Figure 1:
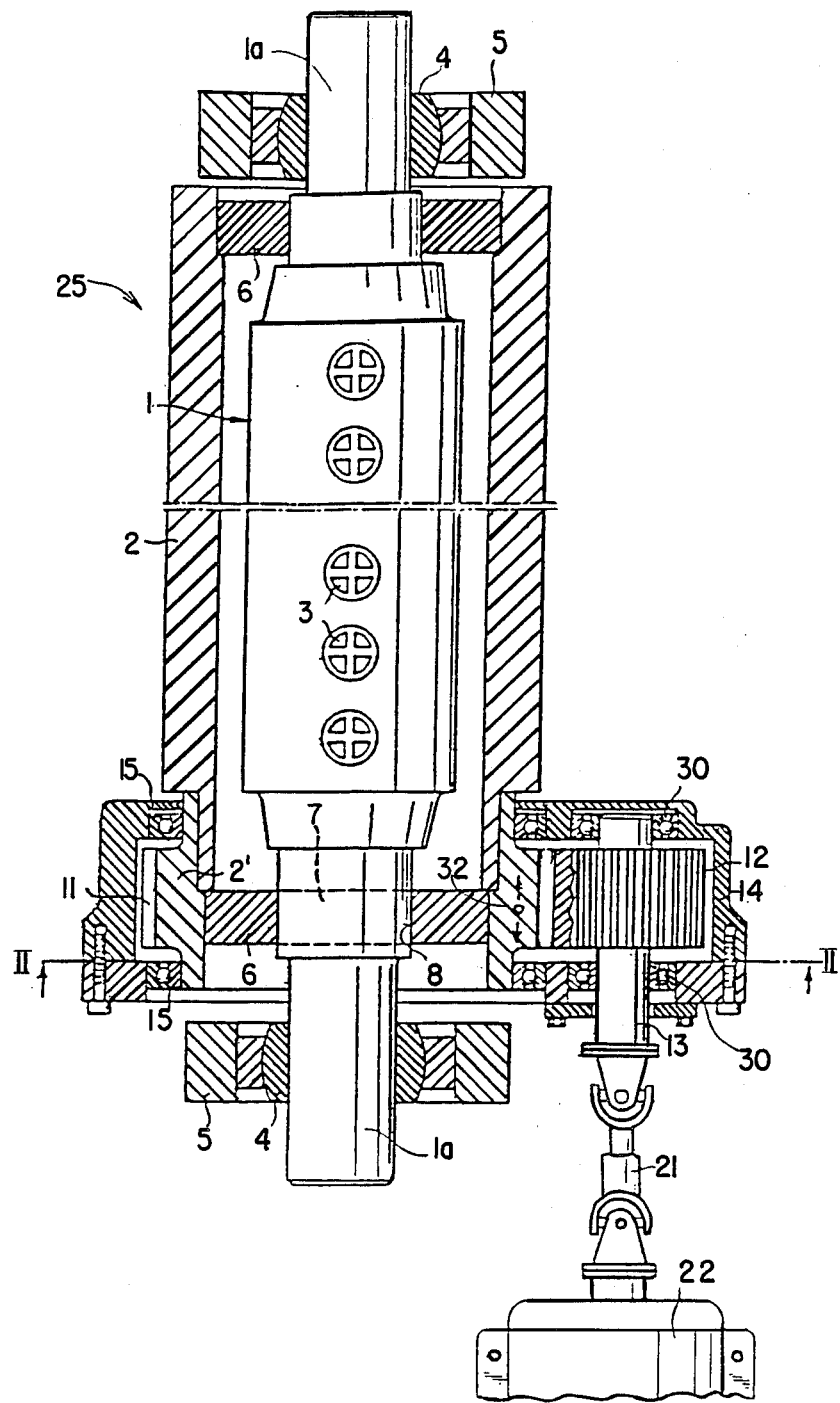
FIG. 1 illustrates a longitudinal section through the roll arrangement at the height or position of the lengthwise axis of the roll shell or jacket.

Turning now specifically to FIG. 1 of the drawings, there has been illustrated therein a roll arrangement containing a controlled deflection roll 25 and which substantially corresponds with the illustration of the roll arrangement of the aforementioned German Pat. No. 2,507,677, to which reference may be readily had. Therefore in the description to follow there will be firstly described enough of the roll arrangement of this prior art construction to provide a general understanding of the environment of the invention followed by a detailed discussion of those features constituting subject matter of the present development. In any event, it will be understood that the depicted roll arrangement containing the controlled deflection roll 25 comprises a non-rotatable or stationary carrier or beam 1 supported in a roll stand or frame 5 or equivalent facility of a roll structure. The journals 1a of this non-rotatable or stationary carrier or beam 1 can follow the deflections or flexures of such non-rotatable or stationary carrier or beam 1 by means of spherical blocks or bearings 4 or equivalent structure.

In the non-rotatable or stationary carrier or beam 1 there are arranged hydrostatic support or pressure elements 3 which are controlled by a pressure or pressurized fluid or fluid medium via feed or supply lines or conduits which extend through the non-rotatable or stationary carrier or beam 1. Since such arrangement is well known in this technology and not important for understanding the present invention, these feed or supply lines or conduits are not shown in the drawings.

A roll shell or jacket 2 is mounted on these hydrostatic support or pressure elements 3. At the ends of the roll shell or jacket 2 guide discs or disc members 6 are disposed on carrier or beam sections or portions 7 of the non-rotatable or stationary carrier or beam 1. These carrier or beam sections or portions 7 are provided with flattened surfaces or flats 8 or the like. Therefore, the guide discs 6 do not rotate in conjunction with the rotatable roll shell or jacket 2, but they guide such rotatable roll shell or jacket 2 in the elevational or lifting direction thereof. For the sake of simplicity in illustration the mounting of the roll shell or jacket 2 at the guide discs 6 has been conveniently illustrated as a sliding or friction bearing.

The roll shell 2 carries at one of its ends an extension sleeve or sleeve member 2' provided with a gearing or gear-tooth system 11 which meshes with a pinion or pinion member 12. A pinion shaft 13 is driven by a suitable drive motor 22 via a coupling assembly 21 comprising, for instance, two synchro-joints and a Cardan shaft or equivalent structure.

The pinion 12 is mounted at a gear housing 14 by means of roller bearings 30. The gear housing 14, in turn, is supported upon the extension sleeve 2' by means of roller bearings 15.

Figure 2:
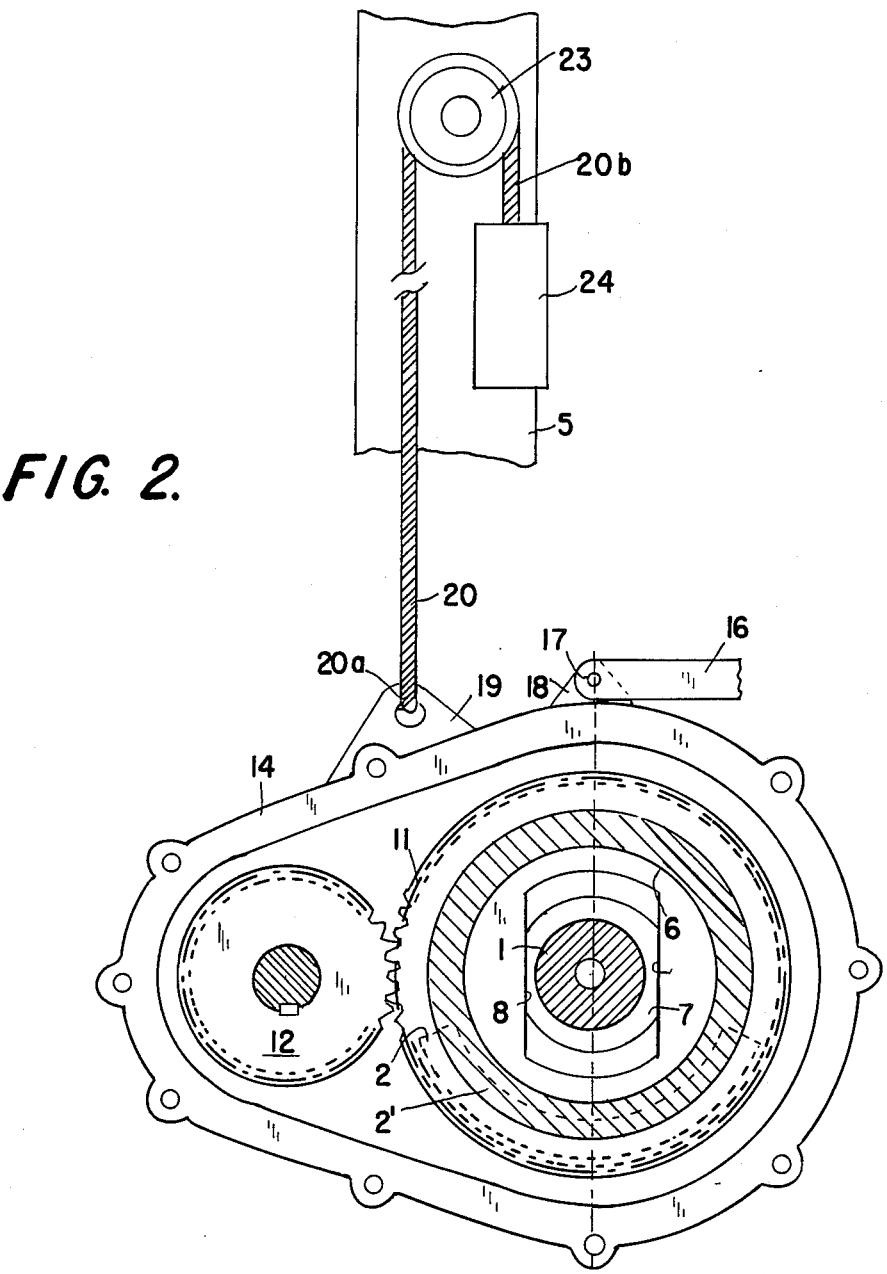
FIG. 2 illustrates a cross-sectional view of the roll arrangement depicted in FIG. 1, taken substantially along the line II—II thereof, but depicted in a 180° turned or reversed illustration.

As shown in FIG. 2, the reaction torque of the rotary drive is articulated at or pivotably transmitted by means of a guide rod 16 to a povot or pivot pin 17 of a projection or lug 18 of the gear housing 14 and appropriately supported at the roll stand 5 or the like such that the aforedescribed gearing system can follow the elevational or lifting movements of the roll shell or jacket 2.

The description up to this point of the exemplary embodiment of the roll arrangement containing the controlled deflection roll 25 substantially corresponds with the aforementioned prior art system of the previously referred to German Pat. No. 2,507,677.

According to specific teachings of the present invention and as shown in FIG. 2, the gear housing 14 is provided with a further projection or lug 19 or equivalent structure in which there is connected a suitable supporting or support element, here shown, for instance, as a steel-wire rope or cable 20 which is hooked at one end 20a into such projection 19. The other end 20b of the steel-wire rope or cable 20 is guided over a wire rope or cable pulley 23 rotatably mounted at the roll stand 5. This wire rope or cable 20 carries at its opposite or other end 20b a counterbalance weight 24, the mass or weight of which corresponds at least approximately with the mass or weight of the parts or components mounted at the extension sleeve or sleeve member 2' as well as with the mass or weight of the extension sleeve 2' itself.

In FIG. 1 the location of the projection or lug 19 is schematically indicated at the position 32. The arrangement here described is chosen such that the steel-wire rope or cable 20 acts at least approximately above the location of the center of gravity of the masses or weights to be compensated, so that these masses or weights cannot cause any bending moments at the roll shell or jacket 2, but the point of application could be displaced axially as generally indicated by the arrows depicted at the position 32, in order that a certain bending moment occurs.

While there are shown and described present preferred embodiments of the invention, it is to be distinctly understood that the invention is not limited thereto, but may be otherwise variously embodied and practiced within the scope of the following claims.

Accordingly, what we claim is:

1. A roll arrangement comprising:
   a roll stand;
   a controlled deflection roll supported by the roll stand;
   said controlled deflection roll comprising:
      a stationary carrier arranged in the roll stand;
      at least one support element;
      a rotatable roll shell supported on said stationary carrier by means of said at least one support element;
      said roll shell having a lengthwise axis;
      said roll shell being displaceable by means of said at least one support element in at least one radial direction relative to said lengthwise axis of said roll shell;
   a load arranged at one end of said roll shell and defining a center of gravity;
   said load having a predeterminate inherent weight;
   said load participating in displacement movements of said roll shell; and
   support means associated with said one end of said roll shell and supporting at the roll stand at least part of the predeterminate inherent weight of said load at least approximately at the region of said center of gravity of said load.

2. The roll arrangement as defined in claim 1, wherein:
   said support means comprise means for at least partially compensating a bending moment which is transmitted from said load to said roll shell.

3. The roll arrangement as defined in claim 2, wherein:
   said load has a center of gravity; and
   said support means supporting at least said part of said predeterminate inherent weight of said load at least approximately at the region of the center of gravity of said load.

4. The roll arrangement as defined in claim 3, further including:
   means provided for said support means to enable said support means to follow said displacement movements of said roll shell and said load.

5. The roll arrangement as defined in claim 4, wherein:
   said support means comprises mechanically acting supporting means.

6. The roll arrangement as defined in claim 1, wherein:

said support means is structured such that a point of application of said support means at the load is axially displaceable relative to said roll shell.

7. The roll arrangement as defined in claim 1, wherein:
   said support means comprising a counterbalance weight operatively connected with said load at least approximately at the region of the the center of gravity of said load.

8. A roll arrangement comprising:
   a roll stand;
   a controlled deflection roll supported by the roll stand;
   said controlled deflection roll comprising:
      a stationary carrier arranged in the roll stand;
      at least one support element;
      a rotatable roll shell supported on said stationary carrier by means of said at least one support element;
      said roll shell having a lengthwise axis;
      said roll shell being displaceable by means of said at least one support element in at least one radial direction relative to said lengthwise axis of said roll shell;
   a load arranged at one end of said roll shell;
   said load having a predeterminate inherent weight;
   said load participating in displacement movements of said roll shell;
   means for supporting at the roll stand at least part of the predeterminate inherent weight of said load;
   said supporting means comprising means for at least partially compensating a bending moment which is transmitted from said load to said roll shell;
   said load having a center of gravity;
   said supporting means supporting at least said part of said predeterminate inherent weight of said load at least approximately at the region of the center of gravity of said load;
   means provided for said supporting means to enable said supporting means to follow said displacement movements of said roll shell and said load;
   said supporting means comprising mechanically acting supporting means; and
   said mechanically acting supporting means comprising a counterweight operatively connected with said load.

9. The roll arrangement as defined in claim 8, wherein:
   said load comprises drive means for rotary drive of said rotatable roll shell.

10. A roll arrangement comprising:
    supporting means for a controlled deflection roll;
    a controlled deflection roll supported by the supporting means;
    said controlled deflection roll comprising:
       a stationary carrier arranged in the supporting means;
       at least one support element;
       a rotatable roll shell supported on said stationary carrier by means of said at least one support element;
       said roll shell having a lengthwise axis;
       said roll shell being displaceable by means of said at least one support element in at least one radial direction relative to said lengthwise axis of said roll shell;
    a load arranged at one end of said roll shell and defining a center of gravity;
    said load having a predeterminate inherent weight;
    said load participating in displacement movements of said roll shell; and
    support means associated with said one end of said roll shell and supporting at least part of the predeterminate inherent weight of said load at least approximately at the region of the center of gravity of said load.

11. The roll arrangement as defined in claim 10, wherein:
    said support means comprising a counterbalance weight operatively connected with said load at least approximately at the region of said center of gravity of said load.

* * * * *